Dec. 7, 1937.  C. CURTIS  2,101,244
PISTON RING
Original Filed Nov. 15, 1933
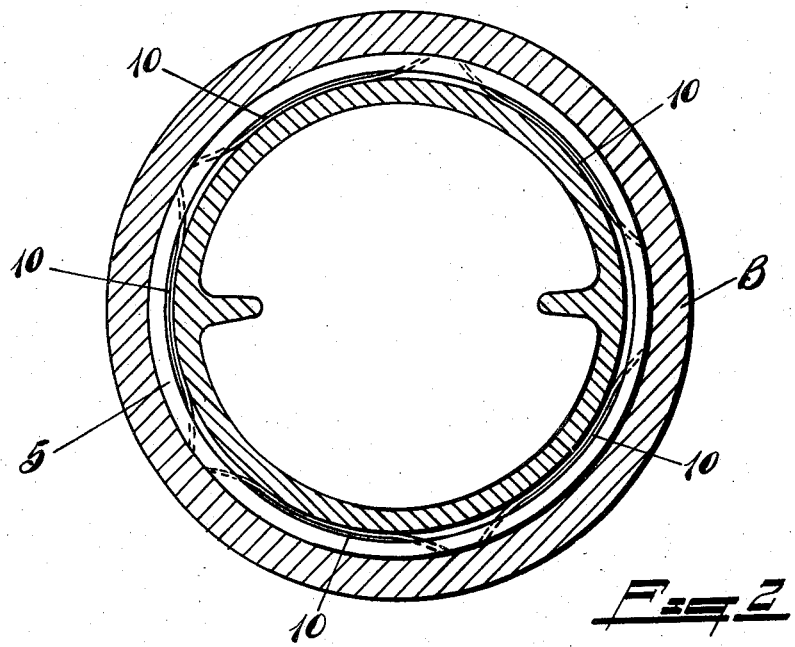
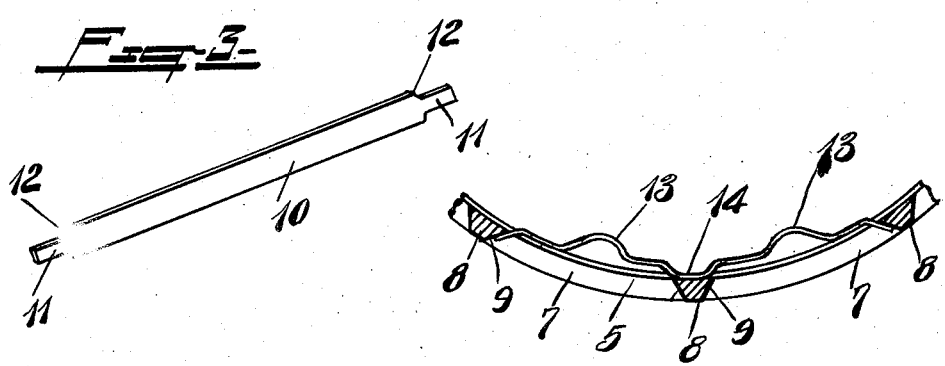
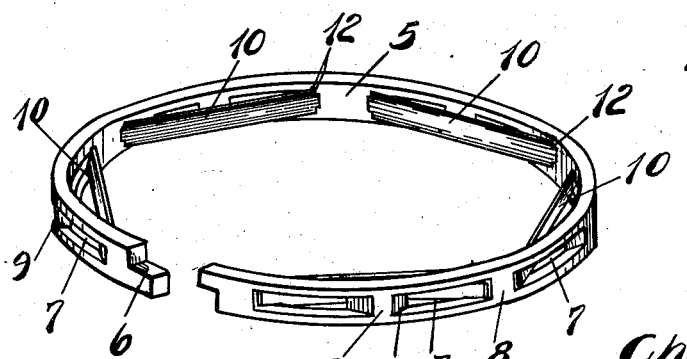
INVENTOR.
Charles Curtis
BY
Frank C. Fearman.
ATTORNEY.

Patented Dec. 7, 1937

2,101,244

UNITED STATES PATENT OFFICE 2,101,244

PISTON RING

Charles Curtis, Chicago, Ill., assignor of twenty-five percent to Fred A. Luthy and twenty-five percent to Deborah R. Luthy, Jackson, Mich.

Application November 15, 1933, Serial No. 698,029
Renewed July 9, 1937

2 Claims. (Cl. 309—41)

This invention relates to piston rings such as used in internal combustion engines, pumps, hydraulic engines and presses, steam engines and pumps, etc., and more particularly to a piston ring in which individual springs are provided for distributing radial stresses uniformly throughout the length of the piston ring.

One of the prime objects of the invention is to design a ring having a plurality of individual springs which are detachably mounted in the ring proper, and which are equally spaced to evenly distribute the radial pressures.

Another object is to provide a piston ring which can be of any desired size or width, and which includes a plurality of individual spring members detachably and slidably mounted on the ring proper, and by means of which even and equal pressures can be exerted and maintained at any desired number of points about the circumference of the ring.

A still further object is to provide a plurality of spring members for application to a piston ring, so that even radial pressures can be provided at any reasonable desired number of points, said pressures remaining constant, regardless of piston or cylinder wear.

A further object still is to design a piston ring including a plurality of individual spring members, the mounting of which in no manner weakens the ring structure, and which further permits the springs to be varied as to size, etc. so that the desired pressures may be obtained.

With the above and other objects in view, the present invention consists in the combination and arrangement of parts, hereinafter more fully described, illustrated in the accompanying drawing, and particularly pointed out in the appended claims, it being understood that changes may be made in the form, size, proportion, and minor details of construction, without departing from the sprit, or sacrificing any of the advantages of the invention.

In the drawing—

Fig. 1 is an isometric view of a piston ring showing the spring members in place thereon.

Fig. 2 is a transverse sectional plan view through a piston and cylinder wall and showing my improved piston ring in position, the broken lines indicating the position of the springs prior to the mounting of the ring on the piston.

Fig. 3 is an enlarged detail of one of the spring members.

Fig. 4 is a fragmentary edge view showing a slightly different spring design.

I am, of course, aware that there are at present on the market piston ring springs which are designed to be placed between it and the piston, so as to maintain the ring in tight engagement with the walls of a cylinder. However, these rings are made up of a single strip of metal, bent to form a polygonal or other desired shape, the corners of the polygon or shape contacting with the inside of the face of the ring to hold the spring in place.

In a ring of this nature the characteristics of the spring metal are, of course, disturbed by the bending operation, and piston thrust ofttimes causes the spring to take a form in which only certain corners contact with the inner face of the ring. The result is an uneven distribution of stresses or pressure, because one section or shape crowds the adjacent section or shape and places more pressure on the crowded section, the spring loses its flexibility, and less "life" is evident in the action of the piston ring; and these aforementioned disadvantages I have overcome in my improved construction in which a plurality of individual spring members are provided, each spring being separate and independent of the others.

In the transition from low speed low compression engines to high speed high compression engines the expansion and contraction of the pistons has again presented a problem. The tolerances must of necessity be close, sufficient radially distributed pressure must be provided against the side walls of the cylinder to prevent the charge blowing by the rings, as this would cause loss of compression and the burning of the lubricant on the cylinder wall. The added heat produced in high speed engines causes greater expansion of the piston; consequently, more tolerance is necessary, and when the motor and pistons are cold these pistons are sloppy and the motor will run "noisy" until it is warmed up and the pistons expanded. This has caused manufacturers to design a piston with a split skirt, others are cam ground, and various other expedients have been resorted to in the endeavor to provide pistons which can be fitted sufficiently close to insure a quiet, smooth running motor when cold and provide for sufficient expansion when hot. None of these expedients has been entirely successful. My improved ring eliminates the sloppiness and noise, as well as the necessity of using split skirts and cam ground pistons, as the radial pressures are balanced and even, each spring is individual, has no connection with the adjacent spring, and the result is evenly distributed pressures throughout the entire 360 degrees.

In the drawing, the numeral 5 indicates the piston ring proper. This is step cut as shown at 6, and a plurality of slotted openings 7 are provided in the circumference of the ring, these slots terminating in a solid bridge 8, the end walls of which are angled as shown at 9, and for a purpose to be presently described.

Individual spring members 10 are adapted to be mounted in the slotted openings 7, and are formed as clearly shown in Fig. 3 of the drawing, the end sections of the springs being cut as shown to provide reduced sections 11, the shoulders 12 being beveled to provide a smooth contact with the inner face of the ring so that it freely slides thereon when the spring is flexed, one end of the spring being mounted in one slot, the opposite end being mounted in the adjacent slot, and these end sections are so disposed as to lie substantially flat on the angled side walls of the bridge section.

These individual springs must be slightly flexed when assembling to permit the end sections 11 to be inserted, and when the ring is in position in a cylinder "B", the springs assume the position as clearly shown in Fig. 2 of the drawing. The fact that each spring is separate and has no connection with the adjacent spring insures true and even radial pressures, evenly spaced about the circumference of the ring, the number of springs used being optional with the manufacturer and suitable to the device in which the ring is used.

While in the attached drawing I have shown my invention embodied in a step cut ring, it will be clearly understood that this is for the purpose of illustration only, as it is readily applicable to a straight cut, mitre cut, plain compression, or oil control ring in exactly the same manner.

In Fig. 4 of the drawing I have shown a slightly different spring; the end sections are formed in exactly the same manner, the adjacent sections being crimped or looped as at 13, the center section 14 being bowed inwardly and bearing against the inner face of the ring so that additional pressure points are provided.

Various other designs and shapes may be provided, but these would all fall within the scope of the present invention, which includes a plurality of individual springs.

From the foregoing description it will be obvious that I have perfected a very simple, practical, and efficient piston ring.

What I claim is:

1. A one piece piston ring formed with a plurality of circumferentially spaced slots therein, a plurality of individual spring members mounted thereon and formed with reduced end sections adapted to be accommodated in said slots, and shoulders on the springs to form a bearing against the inner face of the ring.

2. A one piece piston ring formed with a plurality of circumferentially spaced elongated slots therein, each slot being formed with angled end walls, and a plurality of individual spring members removably mounted on said ring and provided with shouldered and reduced end sections adapted to be accommodated in said slots and to slidably engage the angled end walls thereof.

CHARLES CURTIS.